2 Sheets—Sheet 1.
H. NELSON.
Adjustable Model for Shoe-Patterns.
No. 217,137.  Patented July 1, 1879.
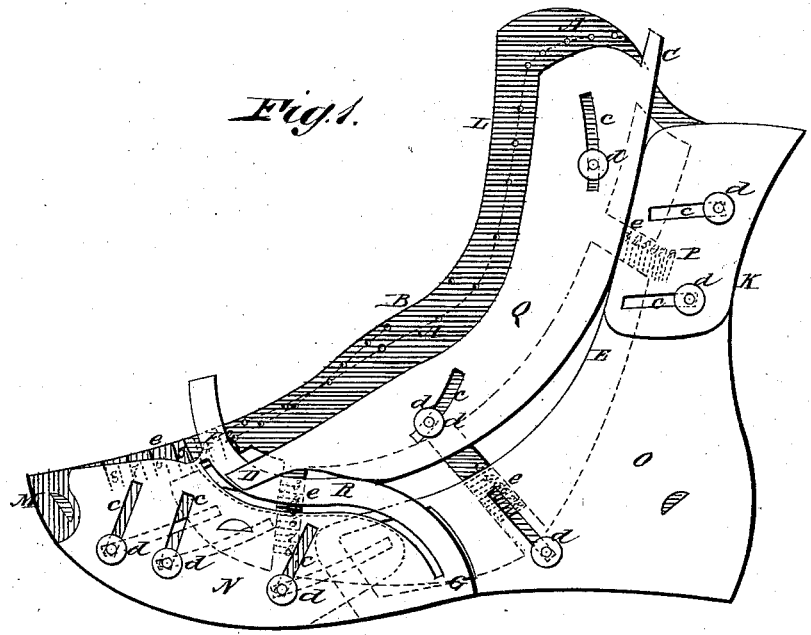
Fig. 1.
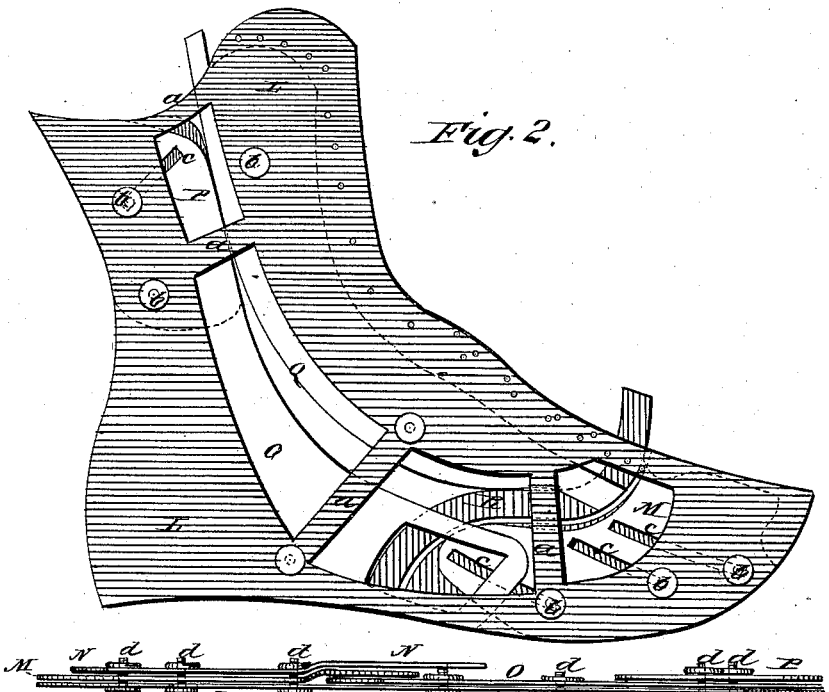
Fig. 2.
Fig. 3.
WITNESSES:
Francis McArdle.
C. Sedgwick.
INVENTOR:
H. Nelson
BY Munn & Co.
ATTORNEYS.
N. PETERS, PHOTO-LITHOGRAPHER, WASHINGTON, D. C.

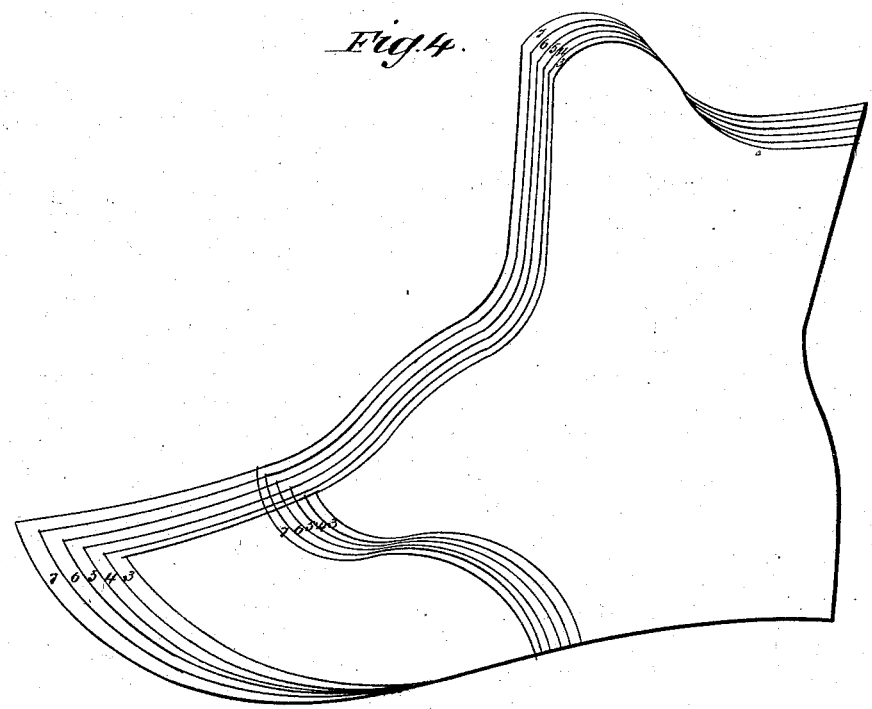

UNITED STATES PATENT OFFICE.

HUGH NELSON, OF PHILADELPHIA, PENNSYLVANIA.

IMPROVEMENT IN ADJUSTABLE MODELS FOR SHOE-PATTERNS.

Specification forming part of Letters Patent No. 217,137, dated July 1, 1879; application filed May 1, 1879.

*To all whom it may concern:*

Be it known that I, HUGH NELSON, of the city and county of Philadelphia, in the State of Pennsylvania, have invented an Improved Adjustable Model for Shoe-Patterns, of which the following is a specification.

The object of this invention is to facilitate the cutting of patterns for ladies', children's, and misses' boots, shoes, gaiters, &c.

It consists of sliding pieces with slots, which receive the ends of screw-studs passed up from a foundation-plate, and provided with nuts, by which the slides are held in any desired position. On the foundation-plate are graduated pieces under each slide, by which they are set to the different-sized patterns.

In the accompanying drawings, Figure 1 is a front view of the model. Fig. 2 is a rear view of the same. Fig. 3 is an edge view. Fig. 4 represents the manner of arranging the model to mark off various sizes of patterns.

Similar letters of reference indicate corresponding parts.

Referring to the drawings, L represents the foundation-plate, having the outline of a shoe-pattern and openings through its center, crossed by strengthening-bars *a a a a*. Through the foundation-plate are passed studs *b*, at suitable points to engage the slides hereinafter mentioned. The studs are screw-threaded.

M is the toe-slide. N is the vamp-slide. O is the heel-slide. P is the top slide, and Q is the button-flap slide, all of which are provided with suitable slots *c*, running in the proper direction to allow them to move in and out to change the size of the pattern. The studs project through these slots, and are provided with nuts *d*, by which the slides are held in place.

Under each of the slides, at proper points, the foundation-plate is graduated to the sizes and half-sizes of the shoes for which the pattern is intended, whether ladies', misses', or children's, as shown at *e e e e*.

The lines of holes A B in the upper edge of the plate L are to mark off respectively the outside quarter and the button-lap in patterns for button-shoes.

To adjust the model to any required size, proceed as follows: Lay the model flat down and loosen the nuts *d*. Now move the heel-slide outward or inward, as the case may be, until the inner edge coincides with the mark on its scale that agrees with the required size of the shoe. Next move the top slide until the outer edge coincides with the outer edge of the heel-slide and the joint at K is evenly made; then the nuts are screwed down. The vamp-slide and the toe-slide are next moved to the same point on their scale and secured. The flap-slide Q is next moved down until its end D coincides with the forward edge of the regularly-curved strip R, forming part of the vamp-slide, where it is secured; and the model is now in condition for marking off patterns of the size to which it is adjusted, as shown in Fig. 1. In Fig. 4 the positions the slides take in all sizes within the limits of the scale are clearly indicated.

The model is adapted to be used in marking patterns for a variety of shoes, boots, gaiters, &c., and also to make the several grades of each number, as B, C, and D, otherwise known as "slim," "regular," and "full" grade.

The manner of employing it for these several purposes will now be set forth at length.

I. *For straight-seam button-gaiters.*—To mark off patterns for this style of gaiter, place the model on the pattern-paper with plate L down; then, with a pencil, mark off the exterior outline of the model; then move the model and cut this pattern out, which forms the inside quarter. For the outside quarter, proceed as before; then, with the point of the pencil, dot on the paper through the line of holes marked A, and when this is done remove the model, cut out the pattern, and cut off the piece divided off at the top by the dots made through the perforations A; next cut a slit in the pattern from the upper side or edge, in line with the rear edge of the curved strip R, so as to obtain the same curve to a depth of about one-quarter of an inch. In this slit, when the upper is put together, is inserted the lower end of the button-flap.

To make the button-flap, place the model as before, and with the pencil make a dot on the paper at the front side of the curved strip R at the point F; then pass the pencil to the other side of the strip, and run it up the paper along the upper edge of the model to the top of the slide Q at C; then mark down the under edge of the slide to the strip R; then cross the strip to its front edge and mark along this edge up to the dot made at the point F at starting. With the point of the pencil, mark through the holes B. Now raise the model and fill in the broken places in the lines, and cut the pattern out according to the lines made. The curved edge of the flap, when the button-holes are to be made, can be scalloped out with a suitable die.

II. *For Agnes boot.*—The inside quarter of this style of boot is marked out in the same way as the same part in No. I. For the inside quarter place the model as before. There are two pieces in the outside of this boot—the button-flap and half-vamp in one piece, and the quarter in the other. Mark from the top of the model at C down the upper edge of the model to the toe, and around the lower edge to G, at the end of the curved strip R. From here pass the pencil along the rear edge of the said strip until it touches the button-lap side at D, thence upward along the under edge of the said slide to the top at C. This gives the button-lap and half-vamp.

For the outside quarter, place the model on the paper, and mark around the top edge of the model down to the lower front edge of the strip R at F, thence along the front edge of the said strip to G, along the bottom edge and up the back to the place of starting; then mark through the line of holes A. This makes the pattern complete. The difference between the front or lower side of the curved strip R in one piece and the rear or upper edge in the other gives the lap for the vamp.

III. *Button vamp-gaiter.*—For the inside quarter, place the model as before. Mark from the top down the upper edge to the lower or front side of the circular strip at F, thence down along this edge to the letter G, from this point along the bottom to the back, up the back to the top, and from here to the place of starting.

For the outside quarter, mark off the same way, except that the lines of holes A are dotted off. For the vamp, double the paper large enough to form the vamp. Place the model on it so that the doubled edge of the paper can be seen in the notch at the letter F in the front edge of strip R, and run thence straight to the point of the toe; then mark from the tip of the toe round the bottom to the end of the strip R, thence along the upper or rear edge of said strip to the top edge of the model. This completes the pattern.

IV. *Front-lace gaiter.*—The pattern for this style is marked out the same as for No. III, except that there is no button-lap cut and only one outside quarter, the same as in No. III, and inside quarter and vamp.

V. *Empress button-boot.*—In this style the vamp and inside quarter are made in one piece. Take a piece of paper large enough to form these two parts, and double the paper at the vamp portion. Lay this down with the half-vamp uppermost, and place the model on it with doubled edge of the paper in line with the toe and the notch at F, as in No. III; then mark round the whole model, except along the doubled edge of the paper from F to the toe, thence down the front edge of the strip R, so as to mark off the half-vamp. Before cutting the half-vamp, open the pattern so as not to divide the quarter from the vamp. The outside quarter is cut in the same way as No. III, also the button-lap.

VI. *Side-lace vamp-gaiter.*—The pattern is the same as No. IV, except that there is a seam up the front and the quarter is cut in the side. To mark off the split in the side, commence at the top of the model and mark down along the edge of the heel and the edge of the top slide (marked E) until the edge of the strip R is reached.

VII. *Side-laced gaiter with front seam.*—This style is marked out the same as the inside quarter of No. I and in side lace of No. VI.

VIII. *Lasting or cloth front seam boot.*—This style is marked out precisely the same as No. I, except that the pattern is made half a size over to allow for heavier seams. For instance, a No. $2\frac{1}{2}$ pattern should be cut from a No. III measurement.

IX. *Lasting or cloth vamp-boot.*—This is marked the same as No. III, but, as in No. VIII, a half-size over.

X. *Lasting lace-gaiter.*—This style is marked the same as No. IV, half-size up.

To mark a pattern for the B or slim grade, make it one-half a size down; for C or regular grade, follow the model exactly; and for the D or full grade, work it up half a size.

To mark off lining-patterns for the various styles, the instructions in each case will have to be followed, except that they will have to be marked a half-size up.

Two button-lap patterns are required in all the button-boots.

Having thus described my invention, I claim as new and desire to secure by Letters Patent—

1. As an improvement in adjustable models for shoe-patterns, the foundation-plate L, having the outline of a shoe-pattern and provided with central longitudinal opening, the graduated cross-bars $a$, the lines of holes A B, and screw-studs $b$, in combination with adjustable slotted slides for giving the outline of the heel-top, vamp, and toe of the shoe-upper, substantially as described.

2. The combination of the adjustable slotted heel-top, vamp, toe, and button-lap slides O, P, N, M, and Q, secured on studs $b$, projecting upward from the foundation-plate L, and provided with nuts $d$, for holding the said slides in place, with the foundation-plate L, provided with the lines of holes A B and the graduated cross-bars $a$ for each slide, to enable the said slides to be adjusted to the required size of the pattern, substantially as described.

3. The regular curved strip R, with front and rear edges for marking off the vamp, in combination with the vamp-slide N and button-lap slide Q, substantially as described.

Witnesses:             HUGH NELSON.
WM. I. FERRAL,
McL. McCARTHY.